United States Patent

Sugaya et al.

[11] Patent Number: 6,067,429
[45] Date of Patent: May 23, 2000

[54] FRICTION MATERIAL AND BRAKING DEVICE AND IMAGE FORMING APPARATUS USING THE FRICTION MATERIAL

[75] Inventors: Tomio Sugaya; Hidehisa Okamura, both of Ibaraki, Japan

[73] Assignee: Hitachi Koki Co., Ltd., Tokyo, Japan

[21] Appl. No.: 09/305,221

[22] Filed: May 5, 1999

[30] Foreign Application Priority Data

May 15, 1998 [JP] Japan .................................. 10-133375
Mar. 9, 1999 [JP] Japan .................................. 11-061225

[51] Int. Cl.[7] .................................................. G03G 15/00
[52] U.S. Cl. ........................ 399/167; 106/36; 188/251 A
[58] Field of Search .................................. 399/117, 167; 106/36; 428/64.1

[56] References Cited

U.S. PATENT DOCUMENTS 4,167,321  9/1979  Miyashita et al. ...................... 399/167
5,570,160  10/1996  Miwa et al. .............................. 399/116
5,962,112  10/1999  Haynes et al. ........................... 428/198

FOREIGN PATENT DOCUMENTS 57-181557  11/1982  Japan .
63-34327   2/1988   Japan .
7-271130   10/1995  Japan .

Primary Examiner—Joan Pendegrass
Attorney, Agent, or Firm—Sughrue, Mion, Zinn, Macpeak & Seas, PLLC

[57] ABSTRACT

A friction material and a braking device and an image forming apparatus using the friction material. The friction material is formed of polyamide elastomer having a bending modulus of elasticity defined to be in a range of from 100 MPa to 500 MPa.

5 Claims, 2 Drawing Sheets

FRICTION MATERIAL AND BRAKING DEVICE AND IMAGE FORMING APPARATUS USING THE FRICTION MATERIAL

BACKGROUND OF THE INVENTION

1. Field of the Invention

The present invention relates to a friction material and a braking device and an image forming apparatus using the friction material.

2. Description of the Related Art

Though the present invention is not limited in a subject of application, the following description is made about a case where the present invention is applied to an image forming apparatus represented by a laser printer, a copying machine, or the like, as an example.

Examples of a member equivalent to a rotation body in an image forming apparatus include a carrying roller for carrying a sheet of paper, a photoconductor support member for making a photoconductor run, a charging or transferring roller for applying an electric charge of predetermined polarity to a surface of the aforementioned photoconductor, a fixing roller, or the like.

It is necessary that these rotation bodies are prevented from rotational fluctuations, or the like, caused by disturbance from a driving system such as motors, pulleys, gears, etc. This is because, in the case where prevention of rotational fluctuations, or the like, is not attained, a problem in printing quality is caused so that the image on a recording medium such as a sheet of paper, or the like, may be recorded as an image extended longer or shrunken shorter in the direction of carrying of the recording medium than an image to be recorded originally or so that density irregularity may occur in the recorded image.

In this type image forming apparatus, therefore, a measure is conventionally taken so that a friction material (brake pad) is provided so as to be in contact with a part of the rotation body under a predetermined pressure to thereby prevent the rotational fluctuations, or the like, of the rotation body caused by disturbance from a driving system. The brake pad of polyamide used in the background art was, however, worn out in short time remarkably, so that the brake pad had to be exchanged for a new one frequently.

SUMMARY OF THE INVENTION

An object of the present invention is to provide a friction material which is intended to prolong the life in connection with application of the aforementioned rotation body, and a braking device and an image forming apparatus using the friction material.

The foregoing object is achieved by a friction material which is in contact with a rotation body, and which is formed of polyamide elastomer having a bending modulus of elasticity defined in a range of from 100 MPa to 500 MPa.

DETAILED DESCRIPTION OF THE INVENTION

Figure 2:
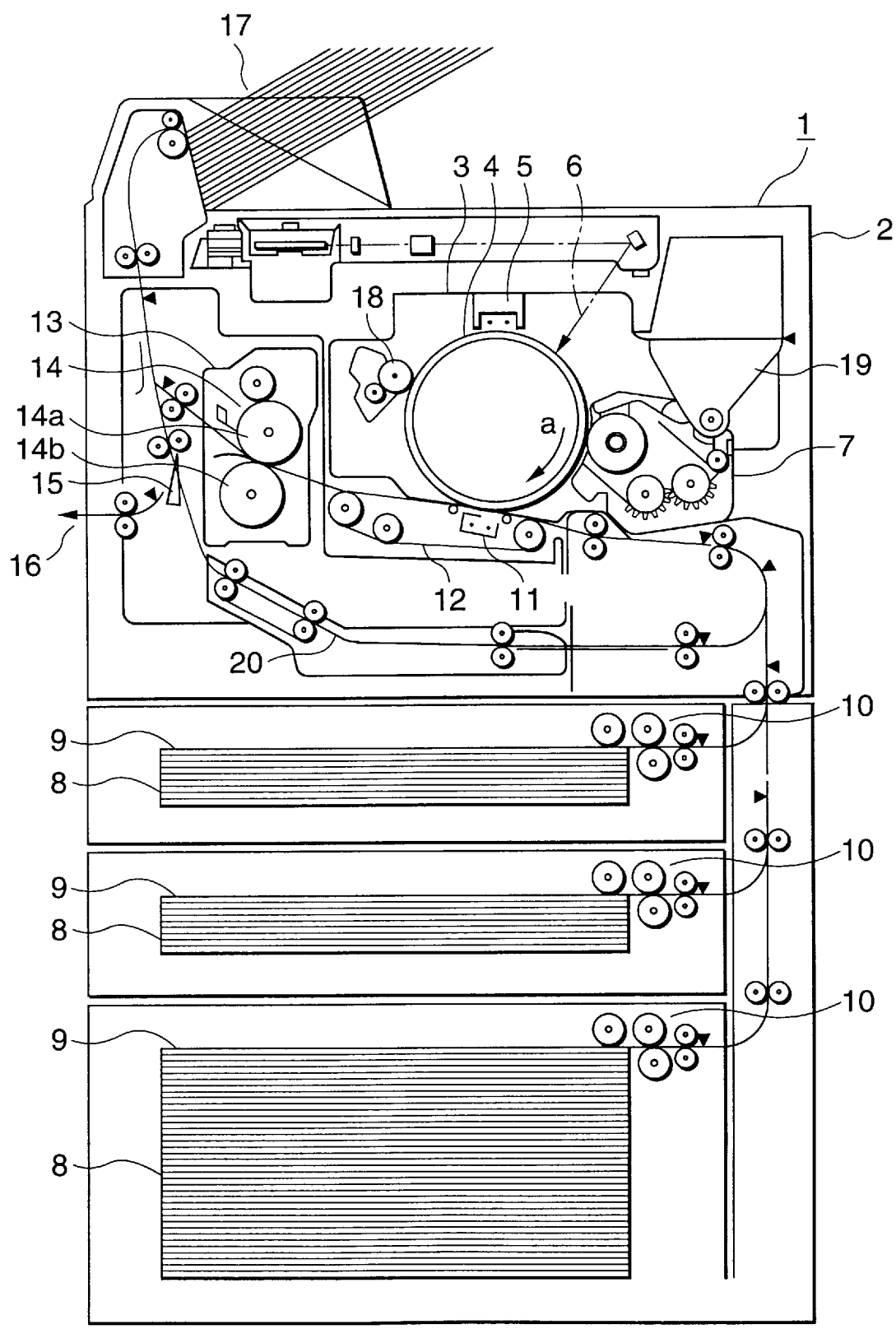
FIG. 2 is an overall front view of an image forming apparatus.

An embodiment of the present invention will be described below with reference to the drawings. First, the overall configuration of an image forming apparatus to which the present invention is applied will be described with reference to FIG. 2. In FIG. 2, the reference numeral 1 designates a body of a basic apparatus. The basic apparatus body 1 has a print/transfer portion 3 which can be drawn out from an apparatus frame 2. The reference numeral 4 designates a photoconductor drum on which a toner image is to be recorded/formed by a known electrophotographic process. The photoconductor drum 4 is supported by a shaft so as to rotate at a predetermined speed in the direction of the arrow a.

A charger 5 is disposed so as to face a surface of the photoconductor drum 4. Facing the charger 5, the surface of the photoconductor drum 4 passes by the charger 5 so as to be electrostatically charged evenly. The evenly electrostatically charged surface of the photoconductor drum is exposed to laser light 6 to form an electrostatic latent image thereon in accordance with a printing information signal given from an information processor. A developer 7 is disposed in opposition to the surface of the photoconductor drum 4 carrying the electrostatic latent image formed thereon. This developer 7 has a developing function for depositing finely powdered toner on the surface of the photoconductor drum 4 on the basis of electrostatic force of the electrostatic latent image to thereby form a toner image.

A sheet cassette 8 is provided so as to store sheet-like recording media (sheets of printing paper) 9 on which image printing is to be performed by transferring and fixing of the toner image in the condition that the sheets of printing paper 9 are piled up. A paper feed roller mechanism 10 constituting a part of recording medium carrying means takes a sheet of printing paper 9 out of the sheet cassette 8 and feeds the sheet of printing paper 9 toward the photoconductor drum 4. The sheet of printing paper 9 fed from the paper feed roller mechanism 10 is brought into contact with the surface of the photoconductor drum 4 so that a toner image is transferred onto the surface of the sheet of printing paper 9. A transfer device 11 gives electric charges of polarity reversed to that of the toner image to the back surface of the sheet of printing paper 9 being in contact with the surface of the photoconductor drum 4 to generate electrostatic force for moving (transferring) the toner image from the surface of the photoconductor drum 4 onto the front surface of the sheet of printing paper 9.

A carrying belt 12 constituting another part of the sheet carrying means is provided so as to feed the sheet of printing paper 9 carrying the toner image transferred thereonto to a fixing unit 13. A pair of fixing rollers 14 constituted by a heat roller 14a and a pressure roller 14b being in pressure contact with each other heat and press the sheet of printing paper 9 to thereby fix the toner image onto the front surface of the sheet of printing paper 9. The sheet of printing paper 9 fed out from the fixing unit 13 is carried upward as it is so as to be ejected into an ejection portion 17. Alternatively, after the sheet of printing paper 9 fed out from the fixing unit 13 is carried halfway to the ejection portion 17, the paper carrying direction is changed to a downward direction in predetermined timing so that the sheet of printing paper 9 is ejected into another ejection portion 16. Alternatively, after the sheet of printing paper 9 fed out from the fixing unit 13 is carried halfway to the ejection portion 17, the carrying direction is changed to a downward direction in predetermined timing so that the sheet of printing paper 9 is carried to a double-side printing sheet feed path 20. Then, the sheet of printing paper 9 with its front surface subjected to printing is fed to the print/transfer portion 3 so that printing is performed onto the back surface of the sheet of printing paper 9. Here, the selection as to whether the sheet of printing paper 9 is to be ejected into the ejection portion 16 or the sheet of printing paper 9 is to be fed to the double-side printing sheet feed path 20 is determined in accordance with the position of a sheet carrying path switching member 15.

Incidentally, in FIG. 2, the reference numeral 18 designates a cleaner for removing foreign matters remaining on the surface of the photoconductor drum 4 such as toner, paper dust, etc., from the surface of the photoconductor drum 4 after the photoconductor drum 4 passes by the transfer device 11. The reference numeral 19 designates a toner replenishing unit for supplying toner to the developer 7 as occasion demands.

Figure 1:
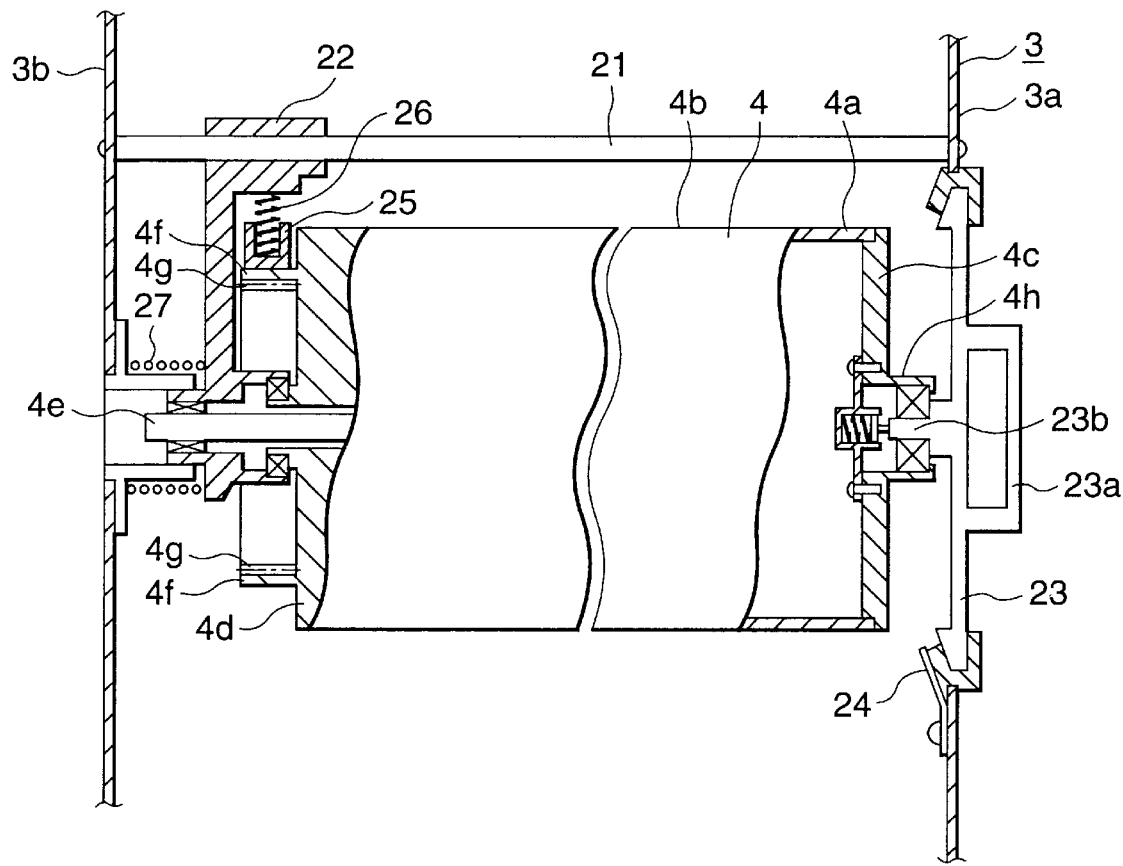
FIG. 1 is a partly sectional side view showing an embodiment of the present invention.

Referring to FIG. 1, an example of application of the present invention will be described below in detail. FIG. 1 is a partly sectional side view in a state in which a photoconductor drum is attached to a print/transfer portion. In FIG. 1, the reference numeral 3 designates a print/transfer portion; and 4, a photoconductor drum. The photoconductor drum 4 is constituted by a cylindrical bare pipe 4a, for example, formed of aluminum, a photoconductor 4b provided on the surface of the bare pipe 4a, a front cap 4c provided on the front side of the bare pipe 4a, a rear cap 4d provided on the rear side of the bare pipe 4a, and a shaft 4e which forms a pivot for rotation of the photoconductor drum 4.

Further, a cylindrical protrusion portion 4f using the shaft 4e as its axial center is formed on the rear cap 4d. A gear 4g is formed in an inner circumferential portion of the cylindrical protrusion portion 4f. Here, the gear 4g is disposed so as to partially engage with a gear (not shown) provided in the print/transfer portion 3 in the condition that the photoconductor drum 4 is attached to the print/transfer portion 3, that is, in the condition of FIG. 1. The photoconductor drum 4 is driven to rotate around the shaft 4e by power transmitted to the gear 4g.

Further, a guide shaft 21 is fixed between the front and rear frames 3a and 3b constituting the print/transfer portion 3. A holding member (hereinafter referred to as "drum shaft bearing member") 22 which is supported so as to be slidable along the guide shaft 21 is provided on the guide shaft 21. Here, the drum shaft bearing member 22 is provided to guide the attachment/detachment position of the photoconductor drum 4 on the print/transfer portion 3 and assist the operation of attachment/detachment. Further, in the drum shaft bearing 22, a friction material (hereinafter referred to as "brake pad") 25 is pressed by a spring 26 so as to be brought into contact with the outer circumferential surface of the cylindrical protrusion portion 4f.

Further, a frame cap 23 provided with a grip 23a is detachably provided in the front frame 3a. Here, a cylindrical protrusion portion 4h formed on the front cap 4c of the photoconductor drum 4 and a bearing portion 23b provided in the inside of the frame cap 23 are fitted to each other. Accordingly, configuration is made such that the photoconductor drum 4 can be drawn out together with the frame cap 23 from the print/transfer portion 3 when the frame cap 23 is detached from the print/transfer portion 3. Incidentally, in FIG. 1, the reference numeral 24 designates an earth plate which is fixed to the front frame 3a and which has an end being in contact with the frame cap 23 so that the frame cap 23 is grounded electrically.

To take out the photoconductor drum 4 in the condition of FIG. 1, the frame cap 23 is turned by a predetermined angle so that the frame cap 23 becomes free from the front frame 3a. When the frame cap 23 becomes free, the photoconductor drum 4 is pushed out by the drum shaft bearing member 22 which is pushed out to the front side by the restoring force of a spring 27. As a result, the photoconductor drum 4 is taken out from the print/transfer portion 3.

The cylindrical protrusion portion 4f formed on the rear cap 4d of the photoconductor drum 4 is formed of a steel material such as S45C material, or the like. The resin brake pad 25 is pressed against the outer circumferential surface of the rear cap 4d by the elastic force of the spring 26. Thus, braking force against the direction of rotation of the photoconductor drum 4 is obtained so that the change of rotation of the photoconductor drum 4 caused by disturbance from a system (motors, pulleys, gears, etc.) for driving the photoconductor drum does not occur.

The brake pad 25 is formed of polyamide elastomer. The ratio of the hard segment of polyamide elastomer to the soft segment of polyamide elastomer is selected adequately so that the bending modulus of elasticity is adjusted to a desired value in terms of braking characteristic. Incidentally, in polyamide elastomer, the bending modulus of elasticity is substantially inversely proportional to the coefficient of friction. Taking easiness of measurement into account, the bending modulus of elasticity is used in the present invention.

It was confirmed that, when the bending modulus of elasticity of polyamide elastomer was set to be in a range of from 100 MPa to 500 MPa according to the present invention, a high value of the friction coefficient of from about 0.4 to about 0.5 was obtained and a braking force sufficient for use in a braking device for the photoconductor drum could be obtained. Because the coefficient of friction was high in this occasion, a predetermined braking force could be obtained even in the case where the elastic force of the spring 26 was set to be a small value not larger than about 1 KPa. Accordingly, it was possible to obtain an effect that braking chatter could be prevented when the brake pad 25 was pressed against the outer circumferential surface of the cylindrical protrusion portion 4f by means of the spring 26.

Polyamide elastomer is produced by copolymerization of hard segments and soft segments, so that the organization of polyamide elastomer is stable. Accordingly, tearing of resin, or the like, is avoided and the abrasion loss is small. Obtained is also an effect that the brake pad 25 can be used for a long term. In this embodiment, hard polyamide such as 12 nylon, or the like, as hard segments and soft polyether as soft segments are connected to each other in a chainlike molecular structure to form copolymerized elastomer.

The relations among the bending modulus of elasticity, the coefficient of friction and other braking characteristic will be described below on the basis of experimental examples. Table 1 shows experimental results of braking characteristic in the case where polyamide brake pads having various bending moduli of elasticity were used. Each of the results was obtained after printing was performed on 1,000,000 pages.

TABLE 1

| Material | Bending Modulus of Elasticity (MPa) | Coefficient of Friction | Chatter | Abrasion Loss (mm) |
|---|---|---|---|---|
| Comparative Example A | 2000 | not larger than 0.3 | present | — |

TABLE 1-continued

| Material | Bending Modulus of Elasticity (MPa) | Coefficient of Friction | Chatter | Abrasion Loss (mm) |
|---|---|---|---|---|
| Comparative Example B | 400 | 0.3–0.5 | absent | 0.50 |
| Elastomer A | 80 | 0.7–1.1 | present | — |
| Elastomer B | 200 | 0.4–0.5 | absent | 0.05 |
| Elastomer C | 350 | 0.35–0.45 | absent | 0.05 |
| Elastomer D | 450 | 0.3–0.4 | absent | 0.05 |
| Elastomer E | 600 | 0.2–0.3 | present | — |

Among the polyamide elastomers, elastomer A having a bending modulus of elasticity of 80 MPa was undesirable because squeak noise (chatter) was generated in the brake pad as shown in Table 1. Further, the aforementioned chatter phenomenon was confirmed in polyamide elastomer having a bending modulus of elasticity smaller than 100 MPa.

Further, when the bending modulus of elasticity was larger than 500 MPa, a braking force sufficient for use in a braking device for the photoconductor drum could not be obtained because the coefficient of friction was small to be equal to or less than 0.3. Although it might be thought of that the reduction of the coefficient of friction was compensated for by increasing the elastic force of the spring 26 to thereby obtain a predetermined braking force, pressing by the brake pad 25 with a larger elastic force than a certain limit caused braking chatter to bring an undesirable result to the braking device.

Further, the abrasion loss of the brake pad 25 was small to be about 1/10 as much as that of a polyamide brake pad (comparative example B) having no elastomer structure and containing a softening agent as additives. A very good result of the abrasion loss was obtained.

Incidentally, to provide polyamide elastomer in the brake pad 25, the whole of the brake pad 25 may be formed of polyamide elastomer or a polyamide elastomer layer of a predetermined thickness may be provided in a part of a holding member formed of a predetermined material such as a metal, a resin, or the like, correspondingly to a portion abutting on the outer circumferential surface of the cylindrical protrusion portion 4f.

As described above, according to the present invention, not only the friction coefficient of a friction material is optimized but also the life of the friction material is intended to be prolonged. Accordingly, a friction material excellent both in performance and in maintenance characteristic and a braking device and an image forming apparatus using the friction material can be provided.

What is claimed is:

1. A braking device provided with a friction material comprising polyamide elastomer having a bending modulus of elasticity defined to be in a range of from 100 MPa (mega-pascal) to 500 MPa, so as to come in contact with a part of a body of rotation.

2. A braking device according to claim 1, wherein said body of rotation is a member for supporting a photoconductor used in an image forming apparatus.

3. An image forming apparatus comprising a front frame, a rear frame provided at a predetermined distance from said front frame, and a photoconductor drum pivotally supported on said front and rear frames;
wherein a friction material of polyamide elastomer having a bending modulus of elasticity defined in a range of from 100 MPa to 500 MPa is brought into pressure contact with at least one axial end portion of said photoconductor drum.

4. An image forming apparatus comprising a front frame, a rear frame provided at a predetermined distance from said front frame, and a photoconductor drum pivotally supported on said front and rear frames;
wherein a cylindrical protrusion portion is provided, with a rotation axis of said photoconductor drum as an axial center, on at least one axial end portion of said photoconductor drum, and a friction material of polyamide elastomer having a bending modulus of elasticity defined in a range of from 100 MPa to 500 MPa is brought into pressure contact with an outer circumferential surface of said cylindrical protrusion portion.

5. An image forming apparatus comprising:
a front frame;
a rear frame provided at a predetermined distance from said front frame;
a guide shaft supported on said front and rear frames;
a photoconductor drum received between said front frame and said rear frame so that a rotation axis of said photoconductor drum is made parallel with said guide shaft;
a holding member provided so as to be slidable in an axial direction of said guide shaft for holding an axially rear end portion of said front frame; and
a frame cap removably provided on said front frame for supporting an axially front end portion of said photoconductor drum;
a cylindrical protrusion portion with a rotation axis of said photoconductor drum as an axial center, on an axially rear end portion of said photoconductor drum; and
a friction material of polyamide elastomer having a bending modulus of elasticity defined in a range of from 100 MPa to 500 MPa is provided on said holding member;
wherein said friction material is brought into pressure contact with an outer circumferential surface of said cylindrical protrusion portion.

* * * * *